(12) United States Patent
Bowen

(10) Patent No.: US 9,896,068 B2
(45) Date of Patent: Feb. 20, 2018

(54) ENERGY RECOVERY SYSTEM

(71) Applicant: EUREKAGEN LIMITED, London (GB)

(72) Inventor: Ryan Bowen, Pembrokeshire (GB)

(73) Assignee: Eurekagen Limited (GB)

( * ) Notice: Subject to any disclaimer, the term of this patent is extended or adjusted under 35 U.S.C. 154(b) by 0 days.

(21) Appl. No.: 15/301,705

(22) PCT Filed: Apr. 2, 2015

(86) PCT No.: PCT/GB2015/051037
§ 371 (c)(1),
(2) Date: Oct. 3, 2016

(87) PCT Pub. No.: WO2015/150821
PCT Pub. Date: Oct. 8, 2015

(65) Prior Publication Data
US 2017/0113663 A1 Apr. 27, 2017

(30) Foreign Application Priority Data
Apr. 2, 2014 (GB) .................................. 1405964.6

(51) Int. Cl.
*B60T 1/10* (2006.01)
*B60K 6/12* (2006.01)
(Continued)

(52) U.S. Cl.
CPC .................. *B60T 1/10* (2013.01); *B60K 6/12* (2013.01); *F15B 1/027* (2013.01); *F15B 1/04* (2013.01);
(Continued)

(58) Field of Classification Search
CPC ........... B60T 1/10; B60K 6/12; B60K 17/356; B60K 2006/123; B60Y 2400/15; Y02T 10/6208
(Continued)

(56) References Cited

U.S. PATENT DOCUMENTS 2,544,606 A * 3/1951 Marion .................... B60K 6/12
180/302
3,892,283 A 7/1975 Johnson
(Continued)

FOREIGN PATENT DOCUMENTS

AU 2011201220 A1 8/2011
CN 101209633 A 7/2008
(Continued)

OTHER PUBLICATIONS

Nov. 4, 2014, Combined Search and Examination Report under Sections 17 and 18(3) from the United Kingdom Intellectual Property Office, in GB Application No. 1405964.6, which this U.S. application shares the benefit of priority.
(Continued)

*Primary Examiner* — Mark Laurenzi
*Assistant Examiner* — Mickey France
(74) *Attorney, Agent, or Firm* — Kolisch Hartwell, P.C.

(57) ABSTRACT

An energy recovery system may include a compressor, an air tank, and a motor. The compressor may have a swashplate member and one or more piston and cylinder assemblies aligned with a compressor axis. The swashplate member may be able to tilt relative to the compressor axis between a no-compression position and a maximum compression position in which each piston can move within its respective cylinder between a top dead center position and a bottom dead center position. The swashplate member may be arranged to be coupled to a shaft so that the compressor axis is substantially aligned with a shaft axis and so that the swashplate member is able to rotate in tandem with the shaft, and also may be able to tilt relative to the compressor axis between no-, maximum-, and intermediate-compression positions. In the no-compression position, each piston may be located at the top dead center position.

13 Claims, 7 Drawing Sheets

(51) Int. Cl.
  *F15B 1/027* (2006.01)
  *F15B 1/04* (2006.01)
  *F15B 1/14* (2006.01)
  *F15B 21/14* (2006.01)

(52) U.S. Cl.
  CPC ........ *F15B 21/14* (2013.01); *B60K 2006/123* (2013.01); *F15B 2211/62* (2013.01)

(58) Field of Classification Search
  USPC ........... 180/302; 188/291; 60/408, 412, 437, 60/628
  See application file for complete search history.

(56) References Cited

U.S. PATENT DOCUMENTS

| | | | |
|---|---|---|---|
| 4,674,280 A | 6/1987 | Stuhr | |
| 5,528,900 A * | 6/1996 | Prasad | B60H 1/2215 62/175 |
| 2006/0000207 A1 | 1/2006 | Rush | |
| 2006/0137925 A1 | 6/2006 | Viergever et al. | |
| 2011/0120107 A1 | 5/2011 | Schwark et al. | |
| 2012/0055159 A1* | 3/2012 | Hicks | F01K 27/00 60/650 |
| 2013/0333969 A1 | 12/2013 | Dieckmann et al. | |
| 2015/0013327 A1* | 1/2015 | Bateham | F03B 13/264 60/497 |

FOREIGN PATENT DOCUMENTS

| | | |
|---|---|---|
| DE | 10 2005 048 712 A1 | 4/2007 |
| DE | 20 2006 019 306 U1 | 4/2008 |
| DE | 10 2007 023 465 A1 | 11/2008 |
| JP | S58-220945 A | 12/1983 |
| JP | 06-088523 A | 3/1994 |
| JP | 2000-073752 A | 3/2000 |
| JP | 2009-97498 A | 5/2009 |
| WO | 80/00992 A1 | 5/1980 |
| WO | 2008/139268 A1 | 11/2008 |
| WO | 2014/166957 A1 | 10/2014 |

OTHER PUBLICATIONS

Jun. 12, 2015, Search Report under Section 17(6)—relating to claims 10, 11, 21, and 22, from the United Kingdom Intellectual Property Office, in GB Application No. 1405964.6, which this U.S. application shares the benefit of priority.

Jun. 12, 2015, Search Report under Section 17(6)—relating to claims 14 and 15, from the United Kingdom Intellectual Property Office, in GB Application No. 1405964.6, which this U.S. application shares the benefit of priority.

Oct. 13, 2015, International Search Report of the International Searching Authority from the European Patent Office, in PCT/GB2015/051037, which is the international application to this U.S. application.

Oct. 13, 2015, Written Opinion of the International Searching Authority from the European Patent Office in PCT/GB2015/051037, which is the international application to this U.S. application.

Oct. 4, 2016, International Preliminary Report on Patentability from the International Bureau of WIPO, in PCT/GB2015/051037, which is the international application to this U.S. application.

* cited by examiner

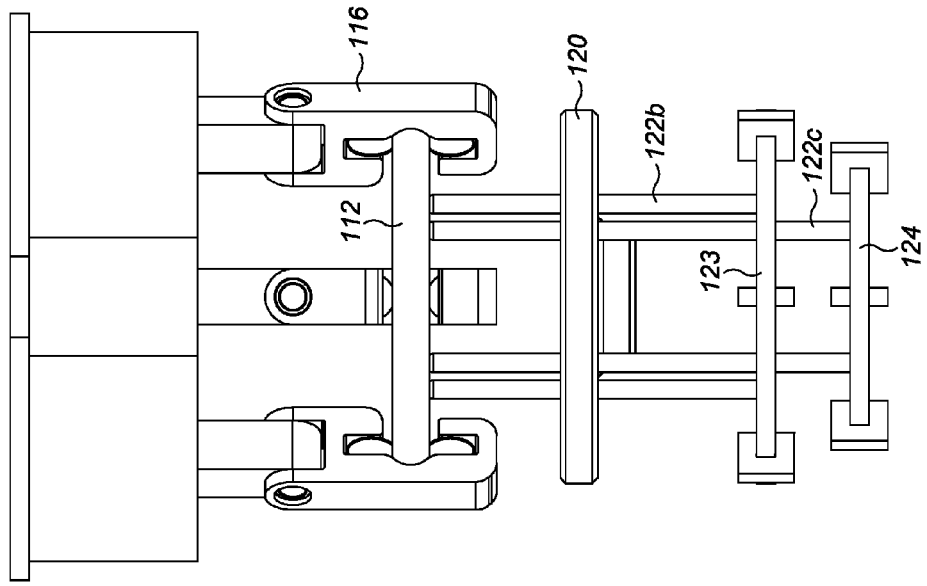
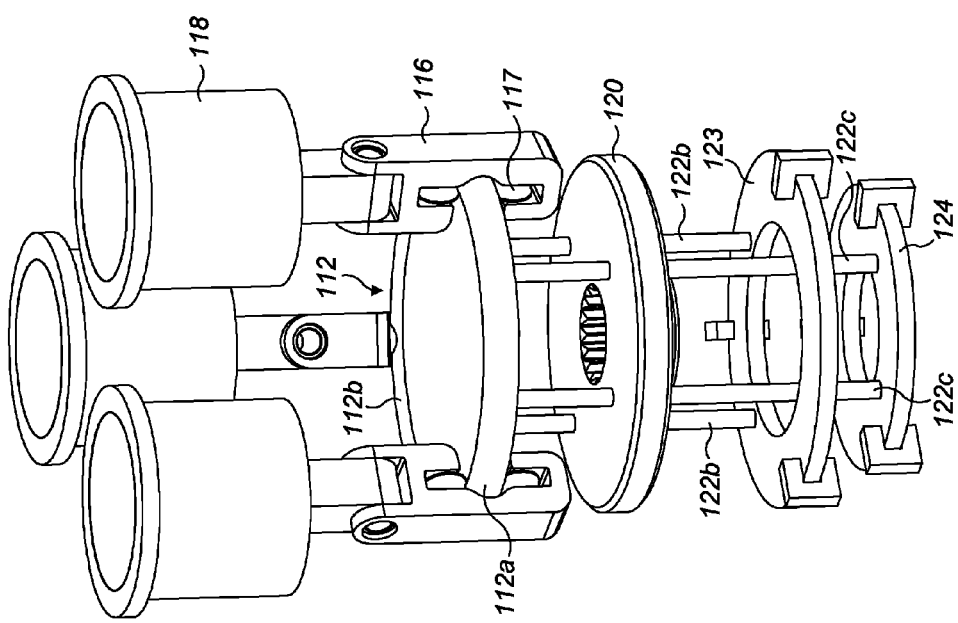

ENERGY RECOVERY SYSTEM

CROSS-REFERENCE TO RELATED APPLICATIONS

This application is a national phase application of PCT/GB2015/051037, filed Apr. 2, 2015, which claims priority to United Kingdom (GB) Patent Application No. 1405964.6, filed Apr. 2, 2014, each of which is hereby incorporated by reference.

FIELD OF THE INVENTION

The present invention relates to energy recovery systems for vehicles, and in particular to energy recovery systems that recover kinetic energy during braking to generate compressed air which is stored for later energy capture by a motor.

BACKGROUND OF THE INVENTION

During periods of deceleration under braking, the kinetic energy generated by the vehicle is typically wasted. Kinetic energy recovery systems (KERS) seek to recover this kinetic energy and store it in an energy reservoir (such as a flywheel or high voltage battery) for later use under acceleration of the vehicle. The advantages of such systems are that they can increase fuel efficiency by ensuring that energy imparted to the vehicle by the engine is not wasted, and that they can provide an additional boost to speed during acceleration.

Known KERS arrangements include those which utilise a flywheel to store recovered kinetic energy and those which include a generator to convert the recovered kinetic energy to electrical energy and a battery to store it. Another arrangement is disclosed in CN101209663, in which a turbine-type air compressor is driven by the drive shaft of a vehicle, and a motor expands the compressed air to extract useful mechanical work therefrom. However, a drawback with this arrangement is that the compressor must be spun up each time it is desired to generate compressed air, a process which is both slow and energy inefficient.

SUMMARY OF THE INVENTION

A first aspect of the invention provides an energy recovery system for a vehicle having a shaft rotatable about a shaft axis and an engine arranged to drive one or more wheels, the energy recovery system including:
a compressor having:
a swashplate member; and
one or more piston and cylinder assemblies, each having an air outlet for outputting a compressed air supply, either the piston or the cylinder of each piston and cylinder assembly being coupled to the swashplate member, and each piston and cylinder assembly being aligned with a compressor axis,
wherein the swashplate member is able to tilt relative to the compressor axis between a no-compression position in which movement of each piston within its respective cylinder is prevented and a maximum compression position in which movement of each piston within its respective cylinder between a top dead centre position and a first bottom dead centre position is permitted, and wherein the swashplate member is arranged to be coupled to the shaft of the vehicle so that the compressor axis is substantially aligned with the shaft axis and so that the swashplate member is able to rotate in tandem with the shaft;
a first air tank arranged to receive compressed air from the air outlets of the one or more piston and cylinder assemblies; and
a motor arranged to expand compressed air from the first air tank to extract mechanical work for delivery to the one or more wheels of the vehicle.

Thus, kinetic energy from the rotating shaft of the vehicle which would otherwise be wasted during deceleration (i.e. under braking) is converted to potential energy for storage as compressed air within the first air tank, and subsequently converted back to kinetic energy to perform mechanical work on the vehicle's wheels during acceleration. A particular advantage of this energy recovery system over known arrangements is that it is not necessary to spin up the compressor each time it is desired to generate compressed air to fill the first air tank. Instead, the swashplate member is always rotating and the compressor can be activated simply by tilting the swashplate member to the compression position, and deactivated by un-tilting it to the no compression position. Thus, the compressor can easily be switched between compressing and non-compressing states without significant energy input. The present arrangement is therefore more efficient than known arrangements.

In preferred embodiments, the system further includes a heat exchanger arranged to receive exhaust gases from the engine of the vehicle and transfer heat from those exhaust gases to compressed air within the air tank.

By transferring waste heat from the vehicle's engine exhaust gases to compressed air within the first air tank, the pressure of that compressed air can be further increased. Thus, heat energy from the exhaust gases is converted to potential energy to supplement that provided by the air compressor. The result is an even more efficient utilisation of energy that would otherwise be wasted while the vehicle is decelerating.

The swashplate member is preferably able to tilt relative to the compressor axis between the no-compression position, the maximum compression position and an intermediate compression position in which movement of each piston within its respective cylinder is permitted between the top dead centre position and a second bottom dead centre position between the top dead centre position and the first bottom dead centre position.

Thus, the compression ratio of the compressor can be controlled simply by controlling the tilt angle of the swashplate member. Moreover, by maintaining a consistent top dead centre (TDC) in both the maximum and intermediate compression positions, the efficiency of the compressor is increased since the volume within each cylinder under the piston when it is at the top of its stroke is always kept to a minimum. Since air is a compressible fluid, any increase in this volume has a significantly detrimental effect on efficiency. Preferably, the swashplate member is able to progressively tilt to any position between the no-compression position and the maximum compression position.

In the no-compression position of the swashplate member each piston is preferably located at the top dead centre position within its respective cylinder. This is a particularly efficient arrangement because it ensures that upon tilting of the swashplate member the initial stroke taken by each piston will be a downward air intake stroke.

The swashplate member may be arranged to be coupled directly to the shaft of the vehicle, or alternatively may be arranged to be coupled by one or more intermediate members. In preferred embodiments the compressor further comprises a base arranged to be fixed to the shaft of the vehicle so as to be rotatable therewith about the compressor axis, wherein the swashplate member is mounted on the base so as to be rotatable therewith about the shaft axis and tiltable relative to the base. This arrangement enables the swashplate member to be tilted about any desired axis. In arrangements in which the swashplate member is coupled directly to the shaft of the vehicle the swashplate member is typically restricted to tilting about the shaft axis, which has the effect that both the top dead centre (TDC) and bottom dead centre (BDC) of each piston and cylinder assembly is altered as the swashplate member is tilted. By altering the TDC in this way the efficiency of the compressor is much reduced. Thus, by tilting the swashplate member about the correct axis to achieve maintenance of a consistent TDC at the top of the stroke of each piston, the efficiency of the compressor is increased.

The swashplate member is preferably mounted on the base via a plurality of linear actuators. This arrangement helps to enable the swashplate member to be tilted about any axis.

The swashplate member preferably comprises an annular track and either the piston or the cylinder of each of the one or more piston and cylinder assemblies is coupled to the annular track by a coupling which is capable of travelling around the annular track. The coupling may comprise one or more bearings (e.g. roller or hydrodynamic bearings) in contact with the track.

In preferred embodiments the system comprises a second air tank arranged to receive compressed air from the air outlets of the one or more piston and cylinder assemblies once compressed air within the first air tank has exceeded a full tank threshold pressure. Thus, the overall efficiency of the system is increased, since the time taken to produce a volume of compressed air ready for use by the motor is reduced. Also, since the two (or more) air tanks provide separate volumes of compressed air for use by the motor, the motor may be activated two (or more) times during acceleration, following only one charging period of deceleration. The second air tank is preferably arranged to deliver compressed air to the motor once compressed air within the first air tank has fallen below an empty tank threshold pressure.

A second aspect of the invention provides an energy recovery system for a vehicle having a shaft rotatable about a shaft axis and an engine arranged to drive one or more wheels, the energy recovery system including:

an air compressor having an air outlet for outputting a compressed air supply, the air compressor being arranged to be driven by the shaft of the vehicle;
a first air tank arranged to receive compressed air from the air outlet of the air compressor;
a second air tank arranged to receive compressed air from the air outlet of the air compressor once compressed air within the first air tank has exceeded a full tank threshold pressure; and
a motor arranged to expand compressed air from the first air tank or second air tank to extract mechanical work for delivery to the one or more wheels of the vehicle.

This arrangement is particularly efficient, since the time taken to produce a volume of compressed air ready for use by the motor is reduced as compared to a system with one larger air tank. Also, since the two (or more) air tanks provide separate volumes of compressed air for use by the motor, the motor may be activated two (or more) times during acceleration, following only one charging period of deceleration. The second air tank is preferably arranged to deliver compressed air to the motor once compressed air within the first air tank has fallen below an empty tank threshold pressure.

The system according to the first or second aspects preferably includes a heat energy recovery circuit comprising:

a closed loop ducting arrangement containing a working fluid;
a heat exchanger arranged to receive exhaust gases from the engine of the vehicle and transfer heat from those exhaust gases to the working fluid to pressurise the working fluid;
a motor arranged to expand the pressurised working fluid to extract mechanical work for delivery to the one or more wheels of the vehicle; and
a condenser arranged to condense the pressurised working fluid output by the motor and deliver the condensed working fluid to the heat exchanger.

In this way, heat energy from the engine exhaust gases that would otherwise be wasted can be used to provide useful work to the vehicle. In particular, the heat energy recovery circuit may be utilised when the compressor is not active and the hot exhaust gases are not being used to heat compressed air within the air tank(s), to ensure that the heat energy it contains is not wasted.

Alternatively, the system according to the first or second aspects may include a heat energy recovery circuit comprising:

a closed loop ducting arrangement containing a working fluid, the closed loop ducting arrangement being configurable to circulate the working fluid through the engine of the vehicle to transfer heat from the engine to the working fluid and thereby pressurise the working fluid;
a motor arranged to expand the pressurised working fluid to extract mechanical work for delivery to the one or more wheels of the vehicle; and
a condenser arranged to condense the pressurised working fluid output by the motor and deliver the condensed working fluid to the closed loop ducting arrangement.

A third aspect of the present invention provides an energy recovery system for a vehicle having an engine arranged to drive one or more wheels, the energy recovery system including:

a closed loop ducting arrangement containing a working fluid, the closed loop ducting arrangement being configurable to circulate the working fluid through the engine of the vehicle to transfer heat from the engine to the working fluid and thereby pressurise the working fluid;
a motor arranged to expand the pressurised working fluid to extract mechanical work for delivery to the one or more wheels of the vehicle; and
a condenser arranged to condense the pressurised working fluid output by the motor and deliver the condensed working fluid to the closed loop ducting arrangement.

Thus, heat which would otherwise be wasted can be used to provide useful mechanical work to the vehicle. This arrangement negates the need for a separate heat exchanger, since the working fluid can be heated directly by the hot engine components. Moreover, the working fluid may replace the conventional fluid cooling system of a vehicle, and thus remove the need for a radiator as conventionally used to transfer the heat from within the engine to the atmosphere. This has an associated weight-saving benefit, which may offset the weight of the additional working fluid, motor and condenser.

The system of the third aspect may further include a heat exchanger arranged to receive exhaust gases from the engine of the vehicle, to receive pressurised working fluid from the closed loop ducting arrangement, and to transfer heat from the received exhaust gases to the received pressurised working fluid to further pressurise the working fluid. In this way, both key sources of waste heat from a conventional vehicle (heat in exhaust gases and heat transferred to atmosphere by a radiator) are utilised to generate useful work for the vehicle.

A further aspect of the invention provides a vehicle comprising the energy recovery system of the first or second aspects. The vehicle may comprise a rear wheel drive, front wheel drive or four wheel drive vehicle, such as a car, particularly a racing car. The compressor of the first or second aspects of the invention may be driven by any rotating shaft of the vehicle, such as a drive shaft or a driven or non-driven wheel axle. The rotating shaft may be located between the engine clutch and the final drive, or wheels, of the vehicle.

A fourth aspect of the invention provides a method of energy recovery in a vehicle comprising:
 a shaft rotatable about a shaft axis and an engine arranged to drive one or more wheels;
 a compressor having:
  a swashplate member; and
  one or more piston and cylinder assemblies each having an air outlet for outputting a compressed air supply, either the piston or the cylinder of each piston and cylinder assembly being coupled to the swashplate member, and each piston and cylinder assembly being aligned with a compressor axis,
  wherein the swashplate member is coupled to the shaft of the vehicle so that the compressor axis is substantially aligned with the shaft axis and so that the swashplate member rotates in tandem with the shaft;
 a first air tank arranged to receive compressed air from the air outlets of the one or more piston and cylinder assemblies; and
 a motor arranged to expand compressed air from the first air tank to extract mechanical work for delivery to the one or more wheels of the vehicle,
 the method including the steps of:
  (i) deceleration of the vehicle, operating the compressor by tilting the swashplate member relative to the compressor axis to permit movement of each piston within its respective cylinder, and storing the compressed air from the compressor in the first air tank; and
  (ii) during acceleration of the vehicle, delivering the stored compressed air from the first air tank to the motor to provide mechanical work to the one or more wheels of the vehicle.

Thus, kinetic energy from the rotating shaft of the vehicle which would otherwise be wasted during deceleration (i.e. under braking) is converted to potential energy for storage as compressed air within the first air tank, and subsequently converted back to kinetic energy to perform mechanical work on the vehicle's wheels during acceleration. A particular advantage of this energy recovery method over known methods is that it is not necessary to spin up the compressor each time it is desired to generate compressed air to fill the first air tank. Instead, the swashplate member is always rotating and the compressor can be activated simply by tilting the swashplate member to the compression position, and deactivated by un-tilting it to the no compression position. Thus, the compressor can easily be switched between compressing and non-compressing states without significant energy input. The present arrangement is therefore more efficient than known arrangements.

Step (i) preferably includes tilting the swashplate member to a maximum compression position in which movement of each piston within its respective cylinder is permitted between a top dead centre position and a first bottom dead centre position. Step (i) preferably further includes adjusting the angle of tilt between the swashplate member and the compressor axis so that movement of each piston within its respective cylinder is permitted between the top dead centre position and a second bottom dead centre position between the top dead centre position and the first bottom dead centre position.

Thus, the compression ratio of the compressor can be controlled simply by controlling the tilt angle of the swashplate member. Moreover, by maintaining a consistent top dead centre (TDC) in both the maximum and intermediate compression positions, the efficiency of the compressor is increased since the volume within each cylinder under the piston when it is at the top of its stroke is always kept to a minimum. Since air is a compressible fluid, any increase in this volume has a significantly detrimental effect on efficiency. Preferably, the swashplate member is progressively tilted to any position between the no-compression position and the maximum compression position The method preferably includes the further step of: (iii) ceasing to operate the compressor by tilting the swashplate member to a no-compression position in which each piston is located at the top dead centre position within its respective piston. This is a particularly efficient arrangement because it ensures that upon tilting of the swashplate member at step (i) the initial stroke taken by each piston will be a downward air intake stroke.

A fifth aspect of the invention provides a method of energy recovery in a vehicle comprising:
 a shaft rotatable about a shaft axis and an engine arranged to drive one or more wheels;
 an air compressor having an air outlet for outputting a compressed air supply, the air compressor being arranged to be driven by the shaft of the vehicle;
 a first air tank and a second air tank arranged to receive compressed air from the air outlet of the air compressor; and
 a motor arranged to expand compressed air from the first air tank or second air tank to extract mechanical work for delivery to the one or more wheels of the vehicle,
 the method including carrying out the sequential steps of:
  (i) during deceleration of the vehicle, operating the compressor and delivering the compressed air from the compressor to the first air tank;
  (ii) when the compressed air in the first air tank reaches a full tank threshold pressure, delivering the compressed air from the compressor to the second air tank; and
  (iii) during acceleration of the vehicle, delivering the stored compressed air from the first air tank to the motor to provide mechanical work to the one or more wheels of the vehicle.

This method is particularly efficient, since the time taken to produce a volume of compressed air ready for use by the motor is reduced as compared to a system with one larger air tank. Also, since the two (or more) air tanks provide separate volumes of compressed air for use by the motor, the motor may be activated two (or more) times during acceleration, following only one charging period of deceleration.

The method of the fifth aspect preferably includes the further step of: (iv) delivering the stored compressed air from the second air tank to the motor once the compressed air within the first air tank has fallen below an empty tank threshold pressure.

Any of the optional, or preferred, features of the invention described herein may be applied to any aspect of the invention, either alone or in any combination. In particular, features of the first aspect may be applied to the fourth aspect, and vice versa, and features of the second aspect may be applied to the fifth aspect, and vice versa.

BRIEF DESCRIPTION OF THE DRAWINGS

Embodiments of the invention will now be described with reference to the accompanying drawings, in which:

FIGS. 4A-D are isometric (4A) and side (4B-D) views of a third compressor for use in the energy recovery system of FIG. 1, shown with an untilted swashplate (4A-B) and a tilted swashplate (4C-D).

DETAILED DESCRIPTION OF EMBODIMENT(S)

Figure 1:
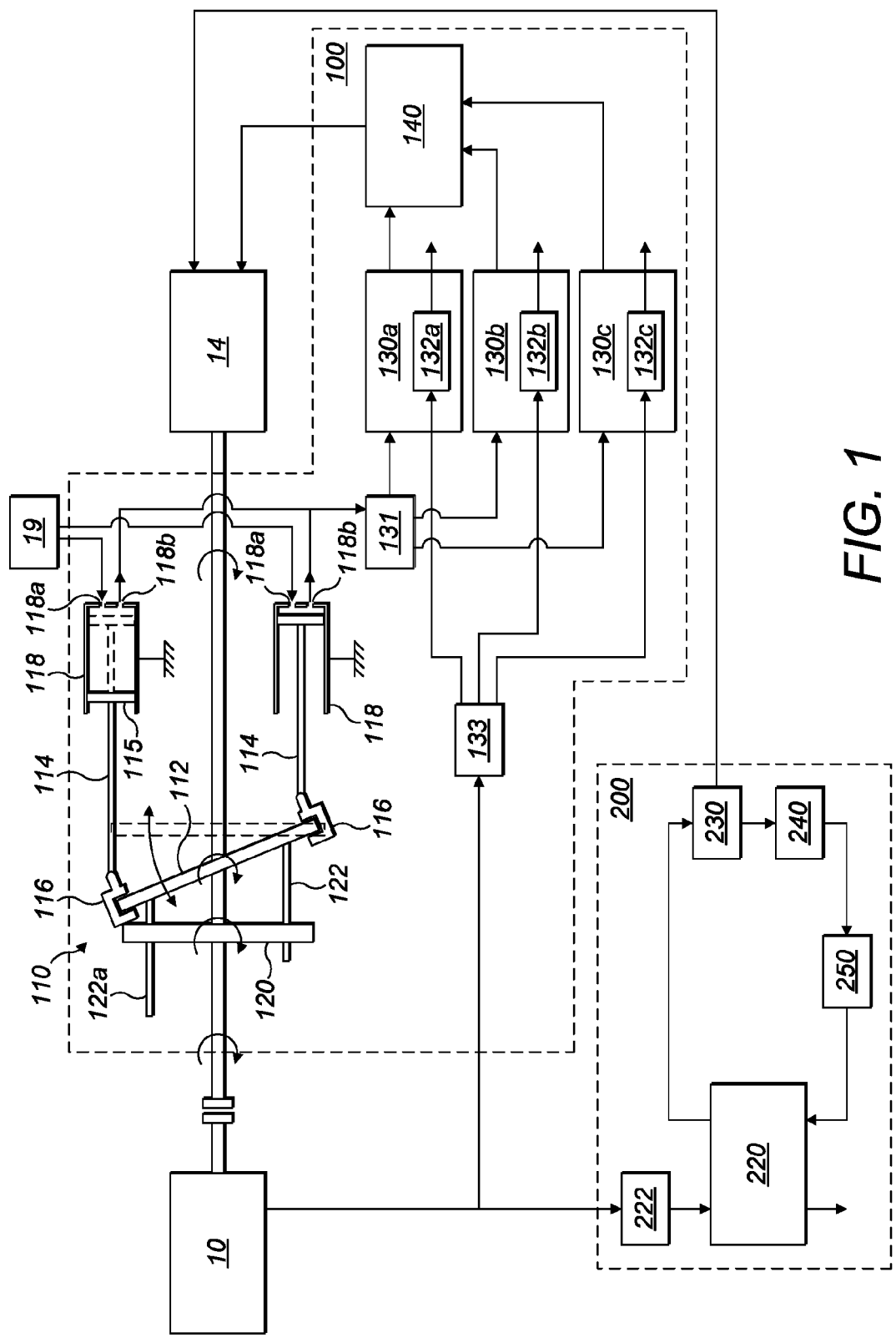
FIG. 1 is a schematic diagram illustrating an energy recovery system according to an embodiment of the invention.
Figure 2B:
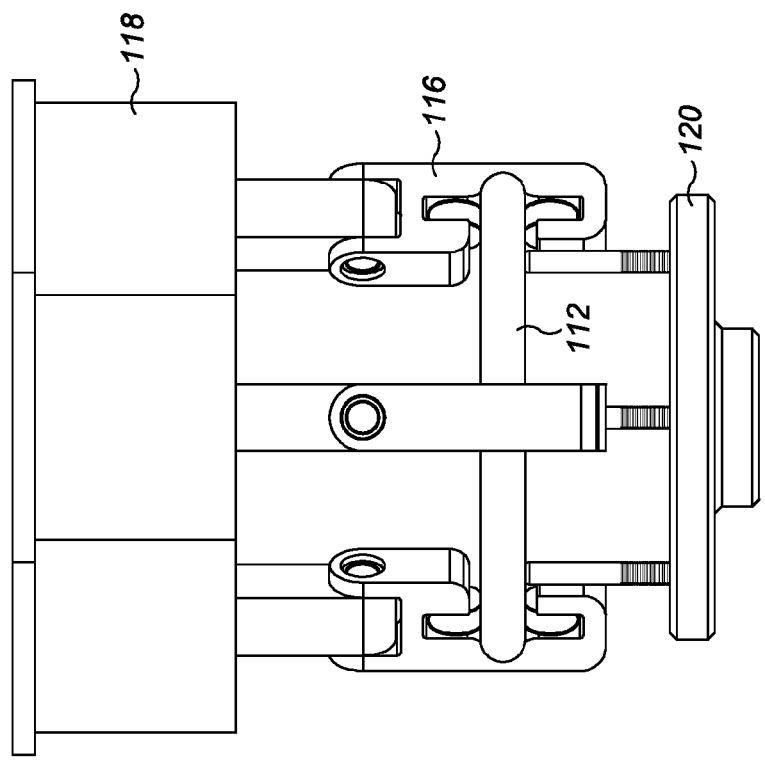
FIGS. 2A-D are isometric (2A) and side (2B-D) views of a first compressor for use in the energy recovery system of FIG. 1, shown with an untilted swashplate (2A-B) and a tilted swashplate (2C-D)
Figure 2A:
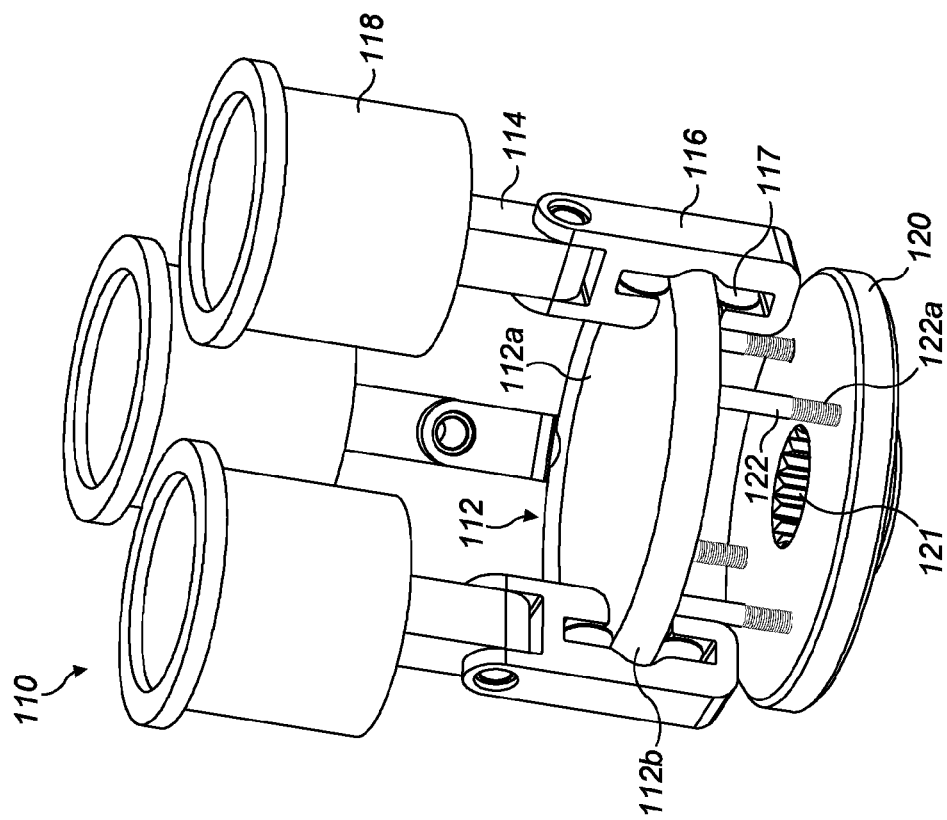
Figure 2D:
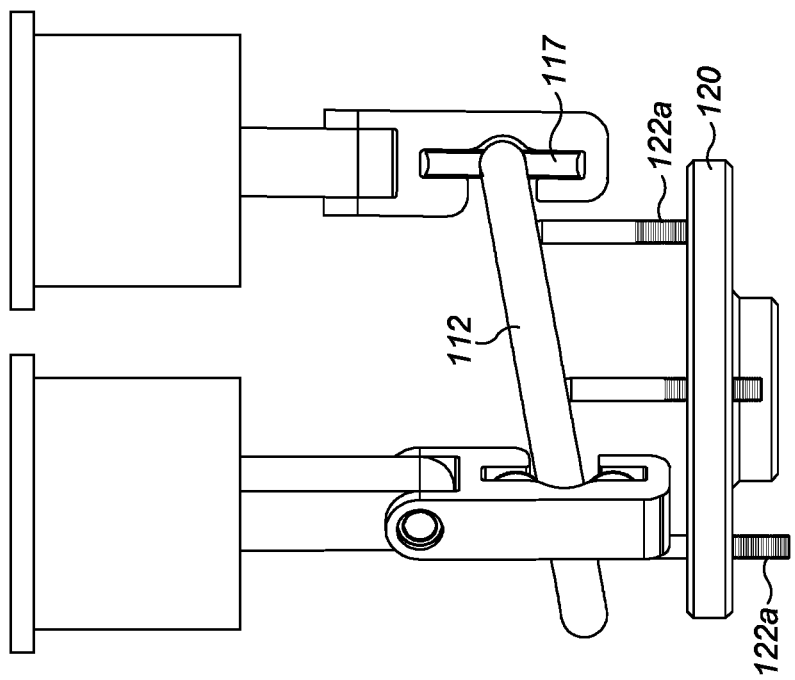
Figure 2C:
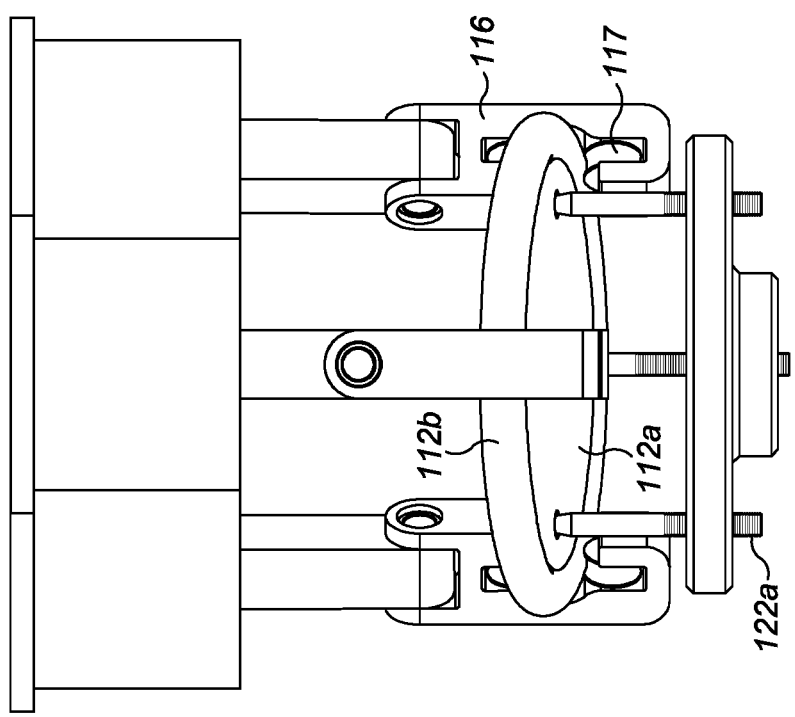
Figure 3B:
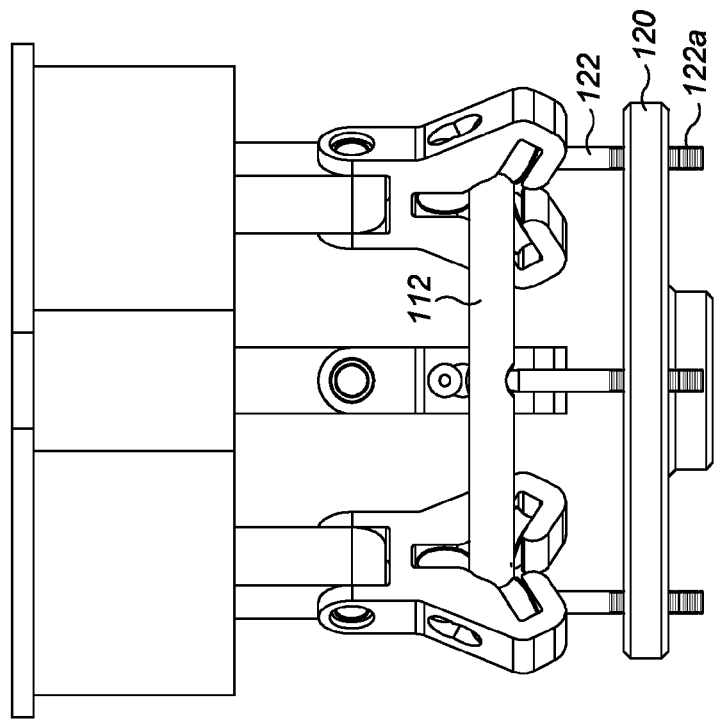
FIGS. 3A-D are isometric (3A) and side (3B-D) views of a second compressor for use in the energy recovery system of FIG. 1, shown with an untilted swashplate (3A-B) and a tilted swashplate (3C-D)
Figure 3A:
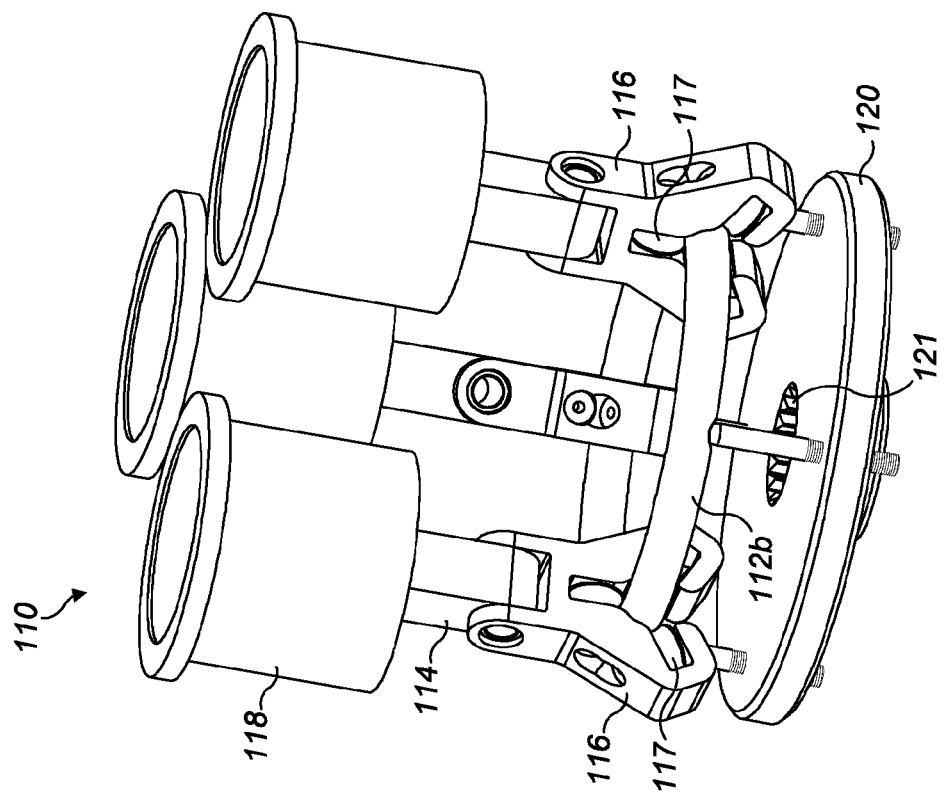
Figure 3D:
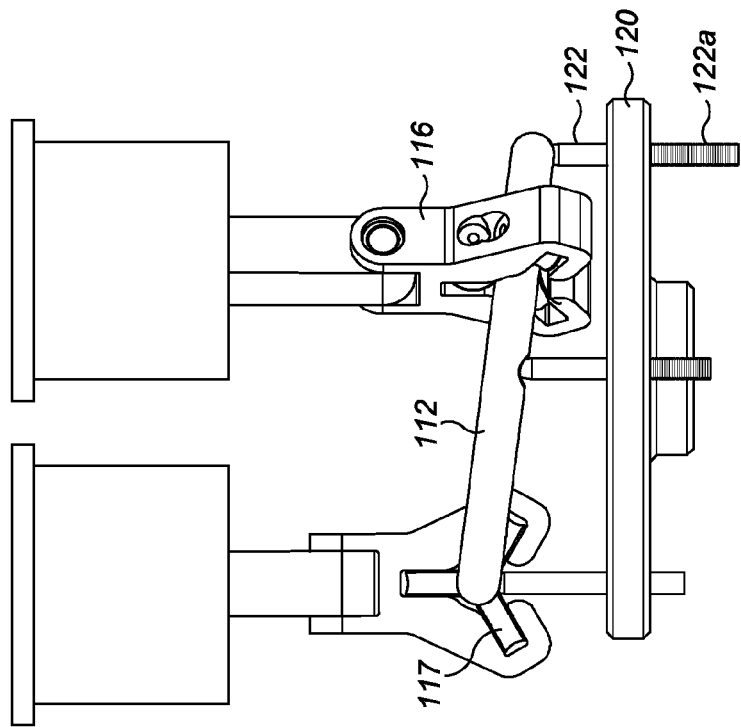
Figure 3C:
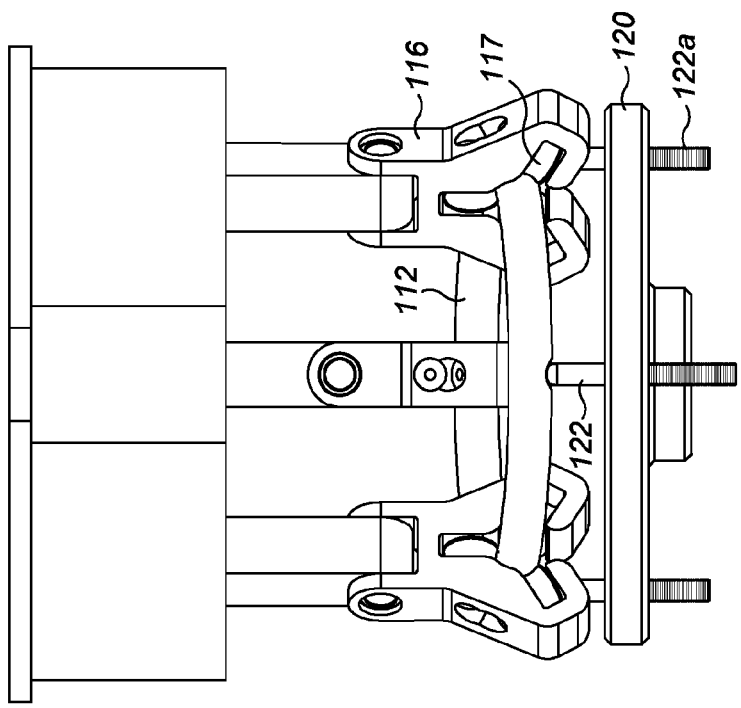

FIG. 1 illustrates, in schematic form, an overview of an energy recovery system according to an embodiment of the invention installed within a vehicle.

The vehicle has a drive train comprising an engine 10 providing a primary power source arranged to provide torque to rotate a drive shaft 12, which in turn provides torque to the final drive 14 of the vehicle. In this embodiment the engine 10 comprises an internal combustion engine, but in other embodiments it may comprise a battery powered electric motor, a compressed air engine, or any other suitable drive system. The final drive 14 typically comprises one or more axles each carrying one or more wheels (not shown). A clutch 16 is operable to disconnect the engine 10 from the drive shaft 12 (and thus from the final drive 14), for example during gear changes.

The skilled reader will recognise that the drive train will necessarily include many other features not illustrated in FIG. 1, such as a gearbox (separated from the engine 10 by the clutch 16). Such features are conventional, and will not be described herein.

During periods where the vehicle is decelerating (i.e. during braking), the drive shaft 12 continues to rotate. The invention is concerned with recovering the energy retained within the vehicle, and particularly within the drive train, during such periods of deceleration and outputting that energy as useful mechanical work to the final drive 14 to supplement the output of the engine 10 during acceleration. A particular application is envisaged in motorsports, where it is desirable to be able to provide an additional boost of speed on straight stretches of racetrack, and where the car is often subjected to heavy braking.

The energy recovery system according to the illustrated embodiment comprises a kinetic and heat energy recovery system (KHERS) 100 and a heat energy recovery system (HERS) 200. Each of these systems can be applied to the vehicle independently or in combination, as illustrated. That is, the energy recovery system may comprise only the KHERS 100, or the KHERS 100 in combination with the HERS 200.

The kinetic and heat energy recovery system (KHERS) 100 uses the continued rotation of the drive shaft 12 during deceleration to compress air in order that its potential energy can be harnessed upon its expansion and turned into useful mechanical work during acceleration. The KHERS 100 includes a swashplate compressor 110 (described in more detail below), which provides compressed air to a series of three air tanks 130a, 130b, 130c. The air tanks store the compressed air before delivering it on demand to an air motor 140. The air motor 140 expands the compressed air and harnesses the released energy to provide an output torque to the final drive 14 of the vehicle.

Suitable swashplate compressors 110 for the KHERS 100 are illustrated in FIGS. 2 to 4. Each compressor 110 includes a swashplate member 112 which provides a peripheral ring-shaped track to which three piston rods 114 are each connected via a coupling 116 comprising either two (FIGS. 2 and 4) or three (FIG. 3) cooperating roller bearings 117. The roller bearings 117 permit the couplings 116 to travel around the track provided by the swashplate member 112. In other embodiments the couplings 116 may each comprise one or more bearing of any suitable type, such as one or more hydrodynamic bearings.

Each piston rod 114 is connected to a piston 115 (not visible in FIGS. 2-4) which is able to move within the bore of a cooperating cylinder 118 to compress air within a compression chamber of that cylinder. Each cylinder includes an air intake port 118a and air outlet port 118b (not shown in FIGS. 2-4), which are controlled by valves in a conventional way and will not be described further here.

The swashplate member 112 is mounted on a base 120 by four jacks 122 which act in combination to tilt the swashplate member 112 relative to the base 120. The base 120 comprises a central splined bore 121 which cooperates with a corresponding splined region on the drive shaft 12 to permit torque transfer from the drive shaft 12 to the base 120.

This arrangement provides that the base 120 and swashplate member 112 rotate in tandem with the drive shaft 12 at all times. The cylinders 118 are mounted in a cylinder head (not shown) which is fixed in relation to the chassis (not shown), and so do not rotate. Instead, the couplings 116 travel around the track provided by the swashplate member 112 as the swashplate member 112 rotates.

When the swashplate member 112 is not tilted in relation to the base 120 (i.e. at its settling point, or no-compression position), as in FIGS. 2A-B, 3A-B and 4A-B, and as shown in phantom in FIG. 1, the pistons 115 do not move within the cylinders 118. However, when the swashplate member 112 is tilted, as in FIGS. 1, 2C-D, 3C-D and 4C-D, the path travelled by the couplings 116 around the track cause the pistons 115 to reciprocate within the cylinders 118. The pistons 115 travel between top dead centre (TDC), which is the position at the top of the stroke at which the piston 115 is as close as possible to the cylinder head without impacting it, and bottom dead centre (TDC) which is the position at the bottom of the stroke.

The downward stroke of the pistons 115 from TDC to BDC causes air to be drawn into the compression chamber of the cylinders 118 from an air intake 119 of the vehicle, via the intake ports 118a. The upward stroke from BDC to TDC causes the air within the cylinders 118 to be compressed and subsequently output via the output ports 118b.

In the no tilt position (no-compression position) the pistons 115 are all at TDC, which is particularly efficient because when the swashplate member 112 is tilted each piston will first commence a downward air intake stroke. The volume of air compressed over each stroke (the compression ratio) in the tilted position (compression position) can be controlled by altering the angle of tilt of the swashplate member 112. The swashplate 112 is always tilted so that the TDC of each piston 115 remains unchanged, with only the BDC being altered. This is advantageous because it ensures that the volume between the end of each piston 115 and the head of its respective cylinder 118 is always maintained at a minimum, so that the efficiency of compression is maximised. The arrangement of the plurality of jacks 122 enables this controlled tilting since by individually controlling each jack 122 it is possible to tilt the swashplate member 112 about any axis, as described further below.

The first, second and third compressors 110 illustrated in FIGS. 2 to 4, respectively, each demonstrate a different way of achieving the travel of the couplings 117 around the track of the swashplate member 112, and of achieving the tilting of the swashplate member 112.

In the first compressor 110, illustrated in FIG. 2, the swashplate member 112 includes a circular plate 112a surrounded by a circular ring-shaped track 112b extending around its periphery. Each coupling 116 comprises a housing supporting two roller bearings 117, one above the track 112b and one below the track. In this way, the two bearings 117 act to clamp the track 112b between them to thereby prevent separation of the coupling 116 from the track.

The jacks 122 of the first compressor 110 each comprise a rigid rod with a first end connected to the circular plate 112a (to the face of the circular plate 112a facing the base 120) via a thrust bearing or other connection which permits rotation of the jack rod relative to the plate but does not permit separation thereof. The rod of each jack 122 has a second end having a male threaded portion 122a which engages with a cooperating female threaded hole in the base 120. By turning the male threaded portion 122a within the female threaded hole, each jack 122 operates to lengthen or shorten the distance between the swashplate member 112 and the base 120 at the location of that jack 122. By controlling each jack 122 independently it is possible to achieve tilting of the swashplate member 112 about any axis, to thereby maintain a constant TDC position at any tilt position of the swashplate member 112.

The second compressor 110, illustrated in FIG. 3, is similar to the first compressor except that the swashplate member 112 has no circular plate, and instead comprises only a circular ring-shaped track 112b. The jacks 112 are rigid rods which interact with the base 120 in the same way as those of the first compressor, but which are connected to the track 112b of the swashplate member 112. In a similar fashion to the first compressor, the jack rods are connected to the track 112b via a thrust bearing or other connector which permits rotation of the jack rod relative to the track, but does not permit separation thereof. In order to prevent fouling between the couplings 116 and the jacks 122, the couplings 116 each comprise three roller bearings 117 arranged equidistantly about the track so that the track is clamped therebetween. As the couplings 116 travel around the track 112b, the rods of the jacks 122 pass through a gap between two of the three bearings 117.

Figure 4C:
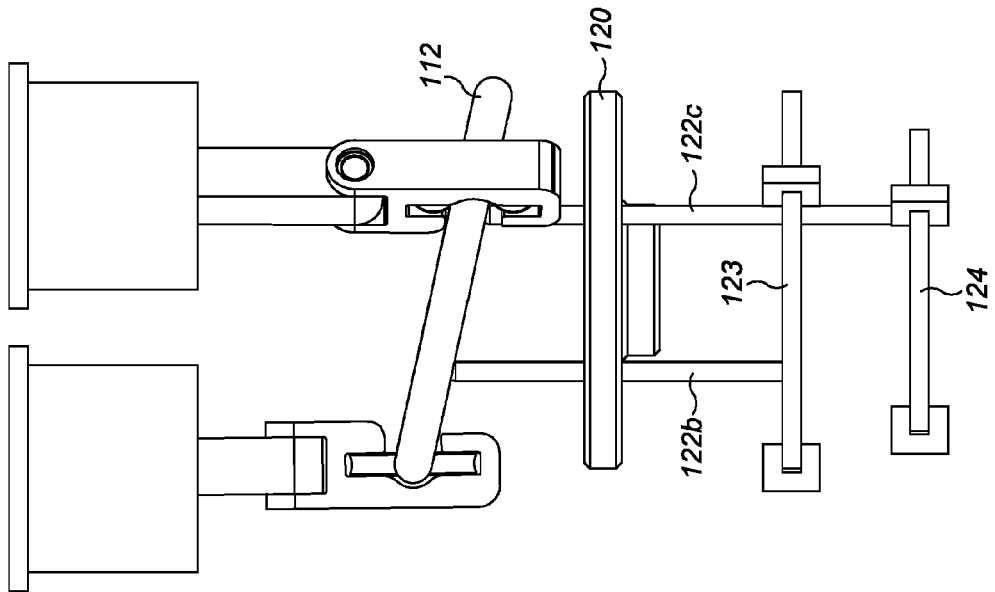
Figure 4D:
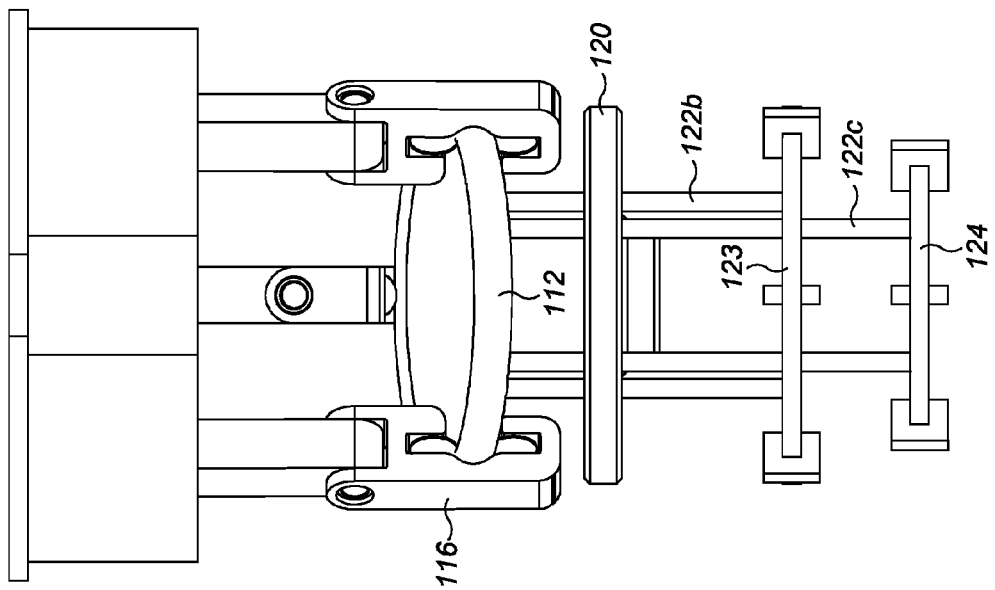

The swashplate member 112 and couplings 116 of the third compressor 110, illustrated in FIG. 4, are identical to those of the first compressor (FIG. 2), but the jacks 122 are different. The jacks 122 of the third compressor each include a rigid rod which is fixed at a first end to the circular plate 112a by welding or other rigid fixing means. The rods each pass through a respective clearance hole in the base 120. A first pair of the rods 122b is fixed at their second ends to a first annular control disc 123, while a second pair of the rods 122c is fixed at their second ends to a second annular control disc 124. By moving the first 123 and second 124 control discs relative to one another, the tilt of the swashplate member 112 can be controlled. That is, by moving the first control disc 123 away from the second control disc 124 the tilt of the swashplate member 112 relative to the base 120 is increased, as demonstrated by FIGS. 4B and 4C.

The features of the first, second and third compressors may be exchanged or combined to provide any number of other compressor variants. For example, the jack arrangement of the third compressor may be combined with the track and coupling arrangement of the second compressor.

By way of the splined connection between the drive shaft 12 and the base 120, as described above, the base 120 and swashplate member 112 rotate continuously with the drive shaft 12. During normal operation of the vehicle when the drive shaft 12 is driven by the engine 10 via the clutch 16, the KERS 100 is not operational. Thus, the swashplate member 112 is not tilted relative to the base (the no compression position) so that there is no relative movement between the pistons 115 and cylinders 118 and the compressor 110 is inactive. During deceleration of the vehicle the KHERS 100 can be activated by tilting the swashplate member 112 relative to the base (to a compression position) to cause reciprocating motion of the pistons 115 within their respective cylinders 118 and output of compressed air via the output ports 118b.

The compressed air from the output ports 118b of the compressor 110 is distributed to the first, second and third air tanks 130a, 130b, 130c via an air direction valve 131 (manifold), which controls which tank is being filled with compressed air at any one time. Each tank 130a-c includes a heat exchanger 132a-c, which receives hot exhaust gases from the engine 10 via an exhaust direction valve 133 that controls which heat exchanger 132a-c receives the exhaust gases at any one time.

In use, the first tank 130a is filled with compressed air until it reaches a first threshold pressure (e.g. 50 bar or 5 MPa, at a temperature of about 350 K), at which point the air direction valve 131 switches to providing compressed air to the second air tank 130b. The exhaust direction valve 133 provides hot exhaust gases to the first heat exchanger 132a so that heat from the exhaust gases is transferred to the compressed air within the first air tank 130a. By heating the compressed air within the first air tank 130a its pressure is further increased. Once a second threshold pressure (e.g. 100 bar or 10 MPa, at a temperature of about 700 K; also referred to as a full tank threshold pressure) is reached the exhaust direction valve 133 switches to providing hot exhaust gases to the second air tank 130b. This process is then repeated for the second 130b and third 130c air tanks and second 132b and third 132c heat exchangers.

Once the air within the first 130a, second 130b and/or third 130c air tanks has reached the second threshold pressure it is ready for delivery to the air motor 140. The first air tank 130a is emptied first, followed by the second 130b and then the third 130c. Once the pressure of the air within the first air tank 130a has fallen below an empty tank threshold pressure (i.e. a pressure below which useful work cannot be obtained from the air), the second air tank 130b can commence delivery of compressed air to the motor 140. This process is then repeated for the third air tank 130c.

In the embodiment of FIG. 1, the compressed air is stored within the first, second or third air tanks 130a-c until it is desired to boost torque to the final drive 14 of the vehicle, at which point the compressed air is released to the air motor 140 for conversion to torque for immediate delivery to the final drive 14. In other embodiments the KHERS 100 may include an energy storage device such as a flywheel (not shown) which stores the torque produced by the air motor 140 for subsequent delivery to the final drive 14. Alternatively, the energy storage device may comprise a generator and battery for generating and storing electrical energy for subsequent delivery to an electric motor, which may be the main electric motor of an electrically-powered vehicle or an auxiliary electric motor.

In electrically powered vehicles in which the engine 10 comprises an electric motor, the energy storage device (not shown) may include a generator for converting the output of the air motor 140 to electrical energy, and a battery for storing that electrical energy for subsequent delivery to the electric motor which in turn provides torque to the final drive 14.

The air motor 140 may comprise any suitable device for expanding compressed air and converting the released potential energy into kinetic energy or mechanical work. Examples include a rotary vane motor or a piston engine. Such devices are conventional and widely understood by the skilled reader, so will not be discussed further here.

In the embodiment of FIG. 1 the compressor 110 is mounted on the drive shaft 12, but in other embodiments the compressor 110 may be mounted on any rotating shaft within the drive train of the vehicle, particularly any rotating shaft between the clutch 16 and the wheels of the vehicle. For example, the compressor 110 may be mounted on the front or wheel axle of the vehicle. In such arrangements the wheel axle may be driven or non-driven; for example, in a rear wheel drive vehicle the compressor 110 may be mounted on the non-driven front wheel axle.

As described above, in the embodiment of FIG. 1 the heat energy recovery system (HERS) 200 operates in tandem with the KHERS 100. The HERS 200 includes a closed circulating line 210 comprising a working fluid such as a refrigerant fluid. The circulating line 210 circulates the working fluid through a heat exchanger 220, a motor 230, a condenser 240, and back to the heat exchanger 220 via a pump 250, in that order. The heat exchanger 220 receives hot exhaust gases from the vehicle engine 10 via an exhaust control valve 222 which can be opened to permit exhaust gas flow to the heat exchanger 220 or closed to prevent such flow.

Within the heat exchanger 220 heat from the exhaust gases is transferred to the working fluid, which becomes super-heated so that it vaporises and experiences a large increase in pressure. The high pressure super-heated working fluid is then delivered to the motor 230 which extracts mechanical work from the working fluid in the form of torque for delivery to the final drive 14 of the vehicle. The motor 230 may comprise a turbine, piston motor, or any other motor which can extract energy from a pressurised fluid.

The working fluid has a reduced temperature and pressure after it has been used by the motor 230, but is still in a gaseous state. It is circulated through the condenser 240, where it is returned to a liquid state before being returned to the heat exchanger 220 by the pump 250.

A suitable low pressure refrigerant is R-113 Trichlorotrifluoroethane. The selection of a particular working fluid is dependent on the desired working temperature. As the skilled reader will understand, it is possible to adjust the working pressures to adjust the temperature at which the fluid will boil or vaporise. Another possible working fluid is water.

The HERS 200 can be switched between operational and non-operational states by opening and closing the exhaust control valve 222, respectively. Thus, a torque boost can be provided to the final drive 14 simply by opening the exhaust control valve 222 to cause the motor 230 to extract work from the working fluid. In some embodiments the HERS may include an energy storage device (not shown) between the motor 230 and the final drive 14 for storing the energy produced by the motor 230 for later on-demand delivery to the final drive 14. The energy storage device may comprise a kinetic energy storage device such as a flywheel, or a generator and battery for generating and storing electrical energy for subsequent delivery to an electric motor, which may be the main electric motor of an electrically-powered vehicle or an auxiliary electric motor.

In use, the KHERS 100 and HERS 200 may be operated at the same time or one at a time. In preferred embodiments, the HERS 200 is operated once the air tanks 130a-c of the KHERS 100 are each filled with compressed air to their respective working pressures (second threshold pressure), so that the heat energy from the exhaust gases is not wasted once it is no longer needed for heating the air within the tanks.

An alternative embodiment of the HERS 200 uses heat within the engine, rather than heat within the engine's exhaust gases, to provide heat to the working fluid line 210. Known vehicles typically incorporate a fluid cooling system which comprises an engine coolant which is circulated around the hot parts of the engine 10, such as the cylinder block and cylinder head, to draw heat from those engine parts. In such known vehicles the heated engine coolant is then conventionally circulated through a radiator which acts as a heat exchanger to transfer the unwanted heat to the atmosphere.

In the proposed alternative embodiment, however, the engine coolant of the vehicle provides the working fluid within the working fluid line 210. There is therefore no requirement for a heat exchanger 220, since the working fluid is heated by the engine 10 and not the exhaust gases. There is also no requirement for the vehicle to have a conventional radiator. This alternative embodiment may therefore have significant weight-saving benefits.

The working fluid (engine coolant) first circulates through the engine 10, where it is super-heated so that it vaporises and experiences a large increase in pressure. The high pressure super-heated working fluid is then delivered to the motor 230 which extracts mechanical work from the working fluid in the form of torque for delivery to the final drive 14 of the vehicle. As in the embodiment of FIG. 1, the motor 230 may comprise a turbine, piston motor, or any other motor which can extract energy from a pressurised fluid.

After it has passed through the motor 230, the working fluid has a reduced temperature and pressure, but is still in a gaseous state. It is circulated through the condenser 240, where it is returned to a liquid state before being returned to the engine 10 by the pump 250. Other embodiments may combine the HERS 200 of FIG. 1 and the above-described alternative embodiment. For example, the engine coolant of the vehicle may provide the working fluid within the working fluid line 210, and the working fluid (engine coolant) may circulate first through the engine 10, where it is heated by the hot components of the engine, and then through a heat exchanger 220, where it is further heated by exhaust gases from the engine 10. The super-heated fluid output by the heat exchanger 220 may then be output to the motor 230, condenser 240 and pump 250, as described above in relation to the FIG. 1 embodiment.

The present disclosure may include one or more of the following concepts:

A. An energy recovery system for a vehicle having a shaft rotatable about a shaft axis and an engine arranged to drive one or more wheels, the energy recovery system including:
 a compressor having:
  a swashplate member;
  and one or more piston and cylinder assemblies, each having an air outlet for outputting a compressed air supply, either the piston or the cylinder of each piston and cylinder assembly being coupled to the swashplate member, and each piston and cylinder assembly being aligned with a compressor axis,
  wherein the swashplate member is able to tilt relative to the compressor axis between a no-compression position in which movement of each piston within its respective cylinder is prevented and a maximum compression position in which movement of each piston within its respective cylinder between a top dead centre position and a first bottom dead centre position is permitted, and wherein the swashplate member is arranged to be coupled to the shaft of the vehicle so that the compressor axis is substantially aligned with the shaft axis and so that the swashplate member is able to rotate in tandem with the shaft;
 a first air tank arranged to receive compressed air from the air outlets of the one or more piston and cylinder assemblies;
 and a motor arranged to expand compressed air from the first air tank to extract mechanical work for delivery to the one or more wheels of the vehicle.

B. A system in accordance with paragraph A, further including a heat exchanger arranged to receive exhaust gases from the engine of the vehicle and transfer heat from those exhaust gases to compressed air within the air tank.

C. A system in accordance with paragraphs A or B, wherein the swashplate member is able to tilt relative to the compressor axis between the no-compression position, the maximum compression position and an intermediate compression position in which movement of each piston within its respective cylinder is permitted between the top dead centre position and a second bottom dead centre position between the top dead centre position and the first bottom dead centre position.

D. A system in accordance with any of the previous paragraphs, wherein in the no-compression position of the swashplate member each piston is located at the top dead centre position within its respective cylinder.

E. A system in accordance with any of the previous paragraphs, wherein the compressor further comprises a base arranged to be fixed to the shaft of the vehicle so as to be rotatable therewith about the compressor axis, wherein the swashplate member is mounted on the base so as to be rotatable therewith about the shaft axis and tiltable relative to the base.

F. A system in accordance with paragraph E, wherein the swashplate member is mounted on the base via a plurality of linear actuators.

G. A system in accordance with any of the previous paragraphs, wherein the swashplate member comprises an annular track and either the piston or the cylinder of each of the one or more piston and cylinder assemblies is coupled to the annular track by a coupling which is capable of travelling around the annular track.

H. A system in accordance with any of the previous paragraphs, comprising a second air tank arranged to receive compressed air from the air outlets of the one or more piston and cylinder assemblies once compressed air within the first air tank has exceeded a full tank threshold pressure.

I. A system in accordance with paragraph H, wherein the second air tank is arranged to deliver compressed air to the motor once compressed air within the first air tank has fallen below an empty tank threshold pressure.

J. An energy recovery system for a vehicle having a shaft rotatable about a shaft axis and an engine arranged to drive one or more wheels, the energy recovery system including: an air compressor having an air outlet for outputting a compressed air supply, the air compressor being arranged to be driven by the shaft of the vehicle; a first air tank arranged to receive compressed air from the air outlet of the air compressor; a second air tank arranged to receive compressed air from the air outlet of the air compressor once compressed air within the first air tank has exceeded a full tank threshold pressure; and a motor arranged to expand compressed air from the first air tank or second air tank to extract mechanical work for delivery to the one or more wheels of the vehicle.

K. A system in accordance with paragraph J, wherein the second air tank is arranged to deliver compressed air to the motor once compressed air within the first air tank has fallen below an empty tank threshold pressure.

L. A system according to any of paragraphs A to K, further including a heat energy recovery circuit comprising: a closed loop ducting arrangement containing a working fluid; a heat exchanger arranged to receive exhaust gases from the engine of the vehicle and transfer heat from those exhaust gases to the working fluid to pressurise the working fluid; a motor arranged to expand the pressurised working fluid to extract mechanical work for delivery to the one or more wheels of the vehicle; and a condenser arranged to condense the pressurised working fluid output by the motor and deliver the condensed working fluid to the heat exchanger.

M. A system according to any of paragraphs A to K, further including a heat energy recovery circuit comprising: a closed loop ducting arrangement containing a working fluid, the closed loop ducting arrangement being configurable to circulate the working fluid through the engine of the vehicle to transfer heat from the engine to the working fluid and thereby pressurise the working fluid; a motor arranged to expand the pressurised working fluid to extract mechanical work for delivery to the one or more wheels of the vehicle; and a condenser arranged to condense the pressurised working fluid output by the motor and deliver the condensed working fluid to the closed loop ducting arrangement.

N. An energy recovery system for a vehicle having an engine arranged to drive one or more wheels, the energy recovery system including: a closed loop ducting arrangement containing a working fluid, the closed loop ducting arrangement being configurable to circulate the working fluid through the engine of the vehicle to transfer heat from the engine to the working fluid and thereby pressurise the working fluid; a motor arranged to expand the pressurised working fluid to extract mechanical work for delivery to the one or more wheels of the vehicle; and
 a condenser arranged to condense the pressurised working fluid output by the motor and deliver the condensed working fluid to the closed loop ducting arrangement.

O. A system in accordance with paragraph N, further including a heat exchanger arranged to receive exhaust gases from the engine of the vehicle, to receive pressurised working fluid from the closed loop ducting arrangement, and to transfer heat from the received exhaust gases to the received pressurised working fluid to further pressurise the working fluid.
P. A vehicle comprising the energy recovery system according to any paragraphs A to O.
Q. A method of energy recovery in a vehicle comprising:
   a shaft rotatable about a shaft axis and an engine arranged to drive one or more wheels;
   a compressor having:
      a swashplate member;
      and one or more piston and cylinder assemblies each having an air outlet for outputting a compressed air supply, either the piston or the cylinder of each piston and cylinder assembly being coupled to the swashplate member, and each piston and cylinder assembly being aligned with a compressor axis,
      wherein the swashplate member is coupled to the shaft of the vehicle so that the compressor axis is substantially aligned with the shaft axis and so that the swashplate member is rotated in tandem with the shaft;
   a first air tank arranged to receive compressed air from the air outlets of the one or more piston and cylinder assemblies; and
   a motor arranged to expand compressed air from the first air tank to extract mechanical work for delivery to the one or more wheels of the vehicle,
   the method including the steps of:
   (i) during deceleration of the vehicle, operating the compressor by tilting the swashplate member relative to the compressor axis to permit movement of each piston within its respective cylinder, and storing the compressed air from the compressor in the first air tank; and
   (ii) during acceleration of the vehicle, delivering the stored compressed air from the first air tank to the motor to provide mechanical work to the one or more wheels of the vehicle.
R. A method in accordance with paragraph Q, wherein step (i) includes tilting the swashplate member to a maximum compression position in which movement of each piston within its respective cylinder is permitted between a top dead centre position and a first bottom dead centre position.
S. A method in accordance with paragraphs Q or R, wherein step (i) includes adjusting the angle of tilt between the swashplate member and the compressor axis so that movement of each piston within its respective cylinder is permitted between the top dead centre position and a second bottom dead centre position between the top dead centre position and the first bottom dead centre position.
T. A method according to any of paragraphs O to S, including the further step of: (iii) ceasing to operate the compressor by tilting the swashplate member to a no-compression position in which each piston is located at the top dead centre position within its respective piston.
U. A method of energy recovery in a vehicle comprising:
   a shaft rotatable about a shaft axis and an engine arranged to drive one or more wheels;
   an air compressor having an air outlet for outputting a compressed air supply, the air compressor being arranged to be driven by the shaft of the vehicle;
   a first air tank and a second air tank arranged to receive compressed air from the air outlet of the air compressor; and
   a motor arranged to expand compressed air from the first air tank or second air tank to extract mechanical work for delivery to the one or more wheels of the vehicle,
   the method including carrying out the sequential steps of:
   (i) during deceleration of the vehicle, operating the compressor and delivering the compressed air from the compressor to the first air tank;
   (ii) once the compressed air in the first air tank reaches a full tank threshold pressure, delivering the compressed air from the compressor to the second air tank; and
   (iii) during acceleration of the vehicle, delivering the stored compressed air from the first air tank to the motor to provide mechanical work to the one or more wheels of the vehicle.
V. A method in accordance with paragraph U, including the further step of: (iv) delivering the stored compressed air from the second air tank to the motor once the compressed air within the first air tank has fallen below an empty tank threshold pressure.

In an embodiment, the present invention proposes an energy recovery system for a vehicle having a shaft rotatable about a shaft axis and an engine arranged to drive one or more wheels. The energy recovery system includes a compressor having: a swashplate member; and one or more piston and cylinder assemblies, each having an air outlet for outputting a compressed air supply, either the piston or the cylinder of each piston and cylinder assembly being coupled to the swashplate member, and each piston and cylinder assembly being aligned with a compressor axis. The swashplate member is able to tilt relative to the compressor axis between a no-compression position in which movement of each piston within its respective cylinder is prevented and a maximum compression position in which movement of each piston within its respective cylinder between a top dead centre position and a first bottom dead centre position is permitted, and wherein the swashplate member is arranged to be coupled to the shaft of the vehicle so that the compressor axis is substantially aligned with the shaft axis and so that the swashplate member is able to rotate in tandem with the shaft. The system further comprises a first air tank arranged to receive compressed air from the air outlets of the one or more piston and cylinder assemblies, and a motor arranged to expand compressed air from the first air tank to extract mechanical work for delivery to the one or more wheels of the vehicle.

Thus, kinetic energy from the rotating shaft of the vehicle which would otherwise be wasted during deceleration (i.e. under braking) is converted to potential energy for storage as compressed air within the first air tank, and subsequently converted back to kinetic energy to perform mechanical work on the vehicle's wheels during acceleration.

Although the invention has been described above with reference to one or more preferred embodiments, it will be appreciated that various changes or modifications may be made without departing from the scope of the invention as defined in the appended claims.

What is claimed is:
1. An energy recovery system for a vehicle having a shaft rotatable about a shaft axis and an engine arranged to drive one or more wheels, the energy recovery system including:
   a compressor having:
      a swashplate member; and
      one or more piston and cylinder assemblies, each having an air outlet for outputting a compressed air supply, either the piston or the cylinder of each piston and cylinder assembly being coupled to the swashplate member, and each piston and cylinder assembly being aligned with a compressor axis, wherein the swashplate member is able to tilt relative to the compressor axis between a no-compression position in which movement of each piston within its respective cylinder is prevented and a maximum compression position in which movement of each piston within its respective cylinder between a top dead centre position and a first bottom dead centre position is permitted, and wherein the swashplate member is arranged to be coupled to the shaft of the vehicle so that the compressor axis is substantially aligned with the shaft axis and so that the swashplate member is able to rotate in tandem with the shaft;

a first air tank arranged to receive compressed air from the air outlets of the one or more piston and cylinder assemblies; and a motor arranged to expand compressed air from the first air tank to extract mechanical work for delivery to the one or more wheels of the vehicle, wherein the swashplate member is able to tilt relative to the compressor axis between the no-compression position, the maximum compression position and an intermediate compression position in which movement of each piston within its respective cylinder is permitted between the top dead centre position and a second bottom dead centre position between the top dead centre position and the first bottom dead centre position; and wherein in the no-compression position of the swashplate member each piston is located at the top dead centre position within its respective cylinder.

2. A system according to claim 1, further including a heat exchanger arranged to receive exhaust gases from the engine of the vehicle and transfer heat from those exhaust gases to compressed air within the air tank.

3. A system according to claim 1, wherein the compressor further comprises a base arranged to be fixed to the shaft of the vehicle so as to be rotatable therewith about the compressor axis, wherein the swashplate member is mounted on the base so as to be rotatable therewith about the shaft axis and tiltable relative to the base.

4. A system according to claim 3, wherein the swashplate member is mounted on the base via a plurality of linear actuators.

5. A system according to claim 1, wherein the swashplate member comprises an annular track and either the piston or the cylinder of each of the one or more piston and cylinder assemblies is coupled to the annular track by a coupling which is capable of travelling around the annular track.

6. A system according to claim 1, comprising a second air tank arranged to receive compressed air from the air outlets of the one or more piston and cylinder assemblies once compressed air within the first air tank has exceeded a full tank threshold pressure.

7. A system according to claim 6, wherein the second air tank is arranged to deliver compressed air to the motor once compressed air within the first air tank has fallen below an empty tank threshold pressure.

8. A system according to claim 1, further including a heat energy recovery circuit comprising:
a closed loop ducting arrangement containing a working fluid;
a heat exchanger arranged to receive exhaust gases from the engine of the vehicle and transfer heat from those exhaust gases to the working fluid to pressurise the working fluid;
a motor arranged to expand the pressurised working fluid to extract mechanical work for delivery to the one or more wheels of the vehicle; and
a condenser arranged to condense the pressurised working fluid output by the motor and deliver the condensed working fluid to the heat exchanger.

9. A system according to claim 1, further including a heat energy recovery circuit comprising:
a closed loop ducting arrangement containing a working fluid, the closed loop ducting arrangement being configurable to circulate the working fluid through the engine of the vehicle to transfer heat from the engine to the working fluid and thereby pressurise the working fluid;
a motor arranged to expand the pressurised working fluid to extract mechanical work for delivery to the one or more wheels of the vehicle; and
a condenser arranged to condense the pressurised working fluid output by the motor and deliver the condensed working fluid to the closed loop ducting arrangement.

10. A vehicle comprising the energy recovery system of claim 1.

11. A method of energy recovery in a vehicle comprising:
a shaft rotatable about a shaft axis and an engine arranged to drive one or more wheels;
a compressor having:
a swashplate member; and
one or more piston and cylinder assemblies each having an air outlet for outputting a compressed air supply, either the piston or the cylinder of each piston and cylinder assembly being coupled to the swashplate member, and each piston and cylinder assembly being aligned with a compressor axis,
wherein the swashplate member is coupled to the shaft of the vehicle so that the compressor axis is substantially aligned with the shaft axis and so that the swashplate member is rotated in tandem with the shaft;
a first air tank arranged to receive compressed air from the air outlets of the one or more piston and cylinder assemblies; and
a motor arranged to expand compressed air from the first air tank to extract mechanical work for delivery to the one or more wheels of the vehicle,
the method including the steps of:
(i) during deceleration of the vehicle, operating the compressor by tilting the swashplate member relative to the compressor axis to permit movement of each piston within its respective cylinder, and storing the compressed air from the compressor in the first air tank; and
(ii) during acceleration of the vehicle, delivering the stored compressed air from the first air tank to the motor to provide mechanical work to the one or more wheels of the vehicle,
wherein step (i) includes:
tilting the swashplate member to a maximum compression position in which movement of each piston within its respective cylinder is permitted between a top dead centre position and a first bottom dead centre position; and
adjusting the angle of tilt between the swashplate member and the compressor axis so that movement of each piston within its respective cylinder is permitted between the top dead centre position and a second bottom dead centre position between the top dead centre position and the first bottom dead centre position, and wherein the method includes the further step of:
(iii) ceasing to operate the compressor by tilting the swashplate member to a no-compression position in which each piston is located at the top dead centre position within its respective piston.

12. A method of energy recovery according to claim 11, wherein the vehicle further includes
a second air tank arranged to receive compressed air from the air outlet of the air compressor, and the motor is arranged to expand compressed air from the first air tank or second air tank to extract mechanical work for delivery to the one or more wheels of the vehicle, wherein step (i) includes:
(a) during deceleration of the vehicle, operating the compressor and delivering the compressed air from the compressor to the first air tank;
(b) once the compressed air in the first air tank reaches a full tank threshold pressure, delivering the compressed air from the compressor to the second air tank.

13. A method according to claim 12, including the further step of: (c) delivering the stored compressed air from the second air tank to the motor once the compressed air within the first air tank has fallen below an empty tank threshold pressure.

* * * * *